United States Patent [19]
Peruglia

[11] 3,826,542
[45] July 30, 1974

[54] VEHICLE ANTI-SKID BRAKING SYSTEM
[75] Inventor: Marco Peruglia, Turin, Italy
[73] Assignee: Fiat Societa Per Azioni, Turin, Italy
[22] Filed: Dec. 6, 1972
[21] Appl. No.: 312,521

[30] Foreign Application Priority Data
Dec. 11, 1971 Italy................................ 71050/71

[52] U.S. Cl................. 303/21 F, 188/181 A, 303/7
[51] Int. Cl.................................................. B60t 8/12
[58] Field of Search...................... 303/21 F, 61–63, 303/68–69, 6 C, 6 A, 13, 7, 40, 28, 21 EB; 188/181

[56] References Cited
UNITED STATES PATENTS
3,620,577  11/1971  Neisch et al..................... 303/21 EB
3,747,992  7/1973  Schnipke.............................. 303/40

Primary Examiner—Duane A. Reger
Assistant Examiner—D. C. Butler
Attorney, Agent, or Firm—Sughrue, Rothwell, Mion, Zinn & Macpeak

[57] ABSTRACT

An anti-skid braking system for a vehicle according to this invention has a main source of fluid pressure connected to a first (e.g. front) brake actuator group of a vehicle and controlled externally, and an ancillary source of fluid pressure connected to a second (e.g. rear) group of brake actuators, or trailer brake actuators, via a repeater valve which is controlled by the pressure of the main pressure source. In this invention the main pressure source is connected to the repeater valve through an anti-skid braking control system which is preferably controlled in response to the dynamic state of the wheels of the second group.

1 Claim, 2 Drawing Figures

VEHICLE ANTI-SKID BRAKING SYSTEM

This invention relates to anti-skid braking systems for vehicles.

BACKGROUND OF THE INVENTION

The term "vehicle" as used herein is intended to include trains of vehicles comprising a towing vehicle and one or more trailers.

More particularly, the invention has as its object a two-way anti-skid braking system for piloting a repeater valve or a relay valve; especially, it concerns braking systems for vehicles or trains of vehicles having an overall wheelbase so long as to require the use of several spaced apart pressure accumulator tanks.

In systems of this type, the braking pressure for a first group of brakes, for example the front brakes, is obtained from a first accumulator tank through a distributor valve operated by the brake pedal, whilst the braking pressure for a second group of brakes, for example the rear brakes is, in order to achieve uniformity of braking upon the different wheels, obtained from another accumulator tank of ancillary tank, through a repeater valve controlled by the same pressure as that derived from the distributor valve.

An anti-skid braking system of the aforesaid type entails the inclusion in the supply pipes of each of the brake-operating cylinders of both the first group of brakes and the second group of a modulating solenoid valve which is normally open and which is by one or more anti-skid control devices which are sensitive to the dynamic conditions of one or more of the wheels of the vehicle.

An object of this invention is the provision of an anti-skid braking system of the aforesaid type, in which the anti-skid system comprises a small number of parts, in which the individual components are under less strain, and in which the power consumption of the anti-skid device is less, with consequent reduction in production, assembly and operation costs, as well as reduced maintenance and increased reliability.

SUMMARY OF THE INVENTION

According to the invention there is provided an anti-skid braking system for a vehicle, comprising a main source of pressure arranged to supply fluid under pressure to a first group of brake actuators of the vehicle under external control, and an ancillary source of pressure arranged to supply fluid under pressure to a second group of brake actuators of the vehicle or of a trailer via a repeater valve controlled by the pressure of the main pressure source, wherein the main pressure source controls the repeater valve via an anti-skid braking control system.

BRIEF DESCRIPTION OF THE DRAWINGS

The invention will now be further described, merely by way of example, with reference to the attached drawings, in which.

DETAILED DESCRIPTION OF THE ILLUSTRATED EMBODIMENT

Figure 1:
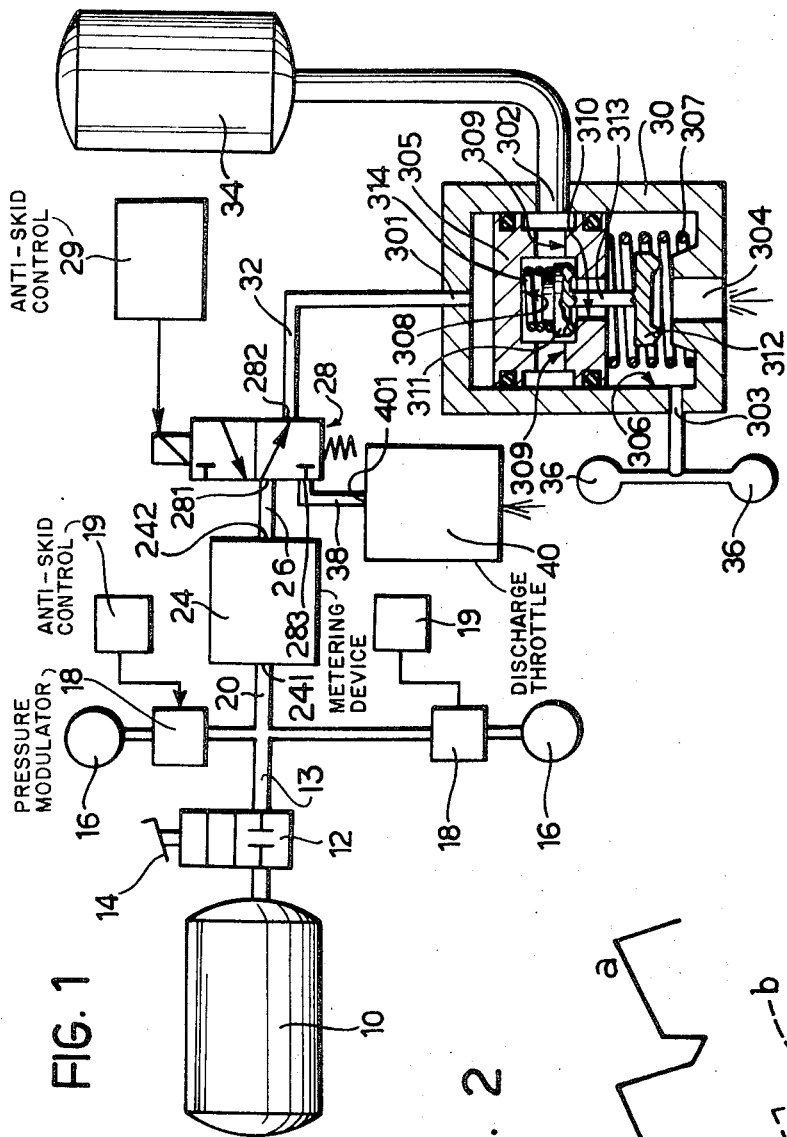
FIG. 1 illustrates diagrammatically an anti-skid braking system according to one embodiment of the invention.

With reference to FIG. 1, a pneumatic pressure accumulator tank 10 is arranged to supply braking pressure to the braking system through a distributor valve 12, controlled by a brake pedal 14. The delivery port of the valve 12 is connected to two brake actuator cylinders 16 which operate the front brakes through respective anti-skid brake pressure modulating devices 18, of any suitable known type. The pressure modulating devices 18 are controlled by respective anti-skid devices 19 arranged so as to control the cyclic release and reapplication of the brakes during braking, in dependence upon the dynamic conditions of one or more wheels of the vehicle.

The delivery port of the distributor valve 12 is also connected via a pipe 20, to an inlet port 241 of an automatic metering or throttling device 24, of the type adapted normally to transfer the pneumatic fluid pressure from said inlet port 241 to an outlet port 242, and to introduce a throttle into the flow of fluid between the said two ports 241, 242 from the moment the pressure at the outlet port 242 drops as a result of a discharge occurring downstream of the port 242 without a corresponding pressure drop occurring at the inlet port 241. a throttling device for this purpose is fully described in a previous Italian Patent Application of the Applicants No. 69918 – A/71, dated Sept. 2, 1971, entitled "Automatic unidirectional delivery throttle" and which corresponds to U.S. Pat. application Ser. No. 275,994 filed July 28, 1972.

The outlet port 242 of the device 24 is connected, via a pipe 26, to an inlet port 281 of a three-way two-position solenoid valve 28, controlled by an anti-skid control device 29, which is sensitive to the dynamic condition of one or more wheels of the vehicle, preferably the rear wheels or the wheels of a trailer, the device 29 being of any suitable known type. The solenoid valve 28 is normally (that is, when de-energized), in a condition which places its inlet port 281 in communication with an outlet port 282. The solenoid valve 28 is energized by the anti-skid control device 29 in the event of incipient skidding of one or more wheels of the vehicle being detected by the latter, to assume a second condition in which the inlet port 281 is closed and the outlet port 282 is in free communication with an exhaust port 283.

An exhaust port 283 of the solenoid valve 28 is connected, via a pipe 38, to a discharge throttle device 40, function of which is to discharge to atmosphere the pneumatic fluid applied at its input 401, either freely or throughh a flow restriction or throttle, according to whether the pressure at its input 401 is less than or greater than a predetermined threshold. A preferred form of such a discharge throttle device 40 is described together, with its advantages and operating characteristics, in the Applicants' previous Italian Patent Application No. 70339 – A/71, entitled "Pneumatic anti-skid braking system for vehicles, with two ways of functioning", dated Oct. 12, 1971, to which reference may be made and which corresponds to U.S. Pat. application Ser. No. 296,699 filed Oct. 12, 1972. The automatic throttling device 24, the solenoid valve 28, and the throttle device 40 constitute as a whole an anti-skid braking control system.

The outlet port 282 of the solenoid valve 28 is connected via a pipe 32, to the control port 301 of a repeater valve or relay valve 30. The repeater valve 30 has an inlet port 302 connected to an accumulator tank 34 which acts as an ancillary source of pneumatic pressure for the rear brakes. Alternatively, the accumulator tank 34 may act as an ancillary source of pressure for the brakes of a trailer attached to the vehicle. The repeated valve 30 also has an outlet port 303 connected to the actuator cylinders 36 of the rear brakes of the rear brakes of the vehicle, or, alternatively, the actuator cylinders of the brakes installed on the trailer. Finally, the repeater valve 30 has an exhaust port 304 leading to the atmosphere.

A bobbin shaped piston 305 moves in a cylindrical bore 306 of the repeater valve 30, under the influence of the control pressure applied to the control port 301, and against a biassing force exerted by a spring 307. An internal chamber 308 in the piston 305 communicates permanently with the inlet port 302 through passages 309 in the wall of the piston 305. Another passage 310, normally closed off by an obturator 311 contained within the chamber 308, interconnects the chamber 308 and the interior of the bore 306 below the piston 305 and therefore, communicates through the outlet port 303 with the actuator cylinders 36. A further obturator 312 is connected rigidly by a rod 313 to the obturator 311, and is located in the cylindrical bore 306 so as to close off the exhaust port 304 when the piston 305 is moved towards the exhaust port 304.

A helical spring 314 acts on the obturator 311 within the chamber 308 to urge the obturator 311, 312 downwards (as viewed in FIG. 1), thereby tending to close the passage 310.

OPERATION

Operation of the system in the case of normal braking without intervention of the anti-skid braking control device is as follows: upon depression of the brake pedal 14, the distributor valve 12 is opened to admit pressurized air from the accumulator tank 10 into the pipe 13 an hence to the front brake actuator cylinders 16. At the same time fluid under pressure is supplied via the pipe 20 to the inlet port 241 of the delivery throttling device 24, flowing out from the outlet port 242 of the latter, through the three-way solenoid valve 28 and hence, since the valve 28 is normally open, through the pipe 32 to the control port 301 of the repeater valve 30, acting upon the upper surface of the piston 305. The piston 305 is displaced against the action of the spring 307, closing off the exhaust port 304 by means of the obturator 312. Further displacement of the piston 305 lifts the obturator 311 against the spring 314 and puts the ancillary accumulator tank 34 in communication with the rear brake actuator cylinders 36.

The movement of the piston 305 is thus strictly subordinated to the fluid pressure in the pipe 32. As a consequence of this the pressure applied to the rear brake cylinders 36 is strictly related to the pressure in the pipe 32; but the pressure in the pipe 32 is, in turn, controlled by the anti-skid braking control system 24, 28, 40 so that the movement of the piston 305, and hence the pressure applied to the rear brake actuator cylinders, 36 will have a rate of increase and of decrease similar to that dictated by the anti-skid control system.

Figure 2:
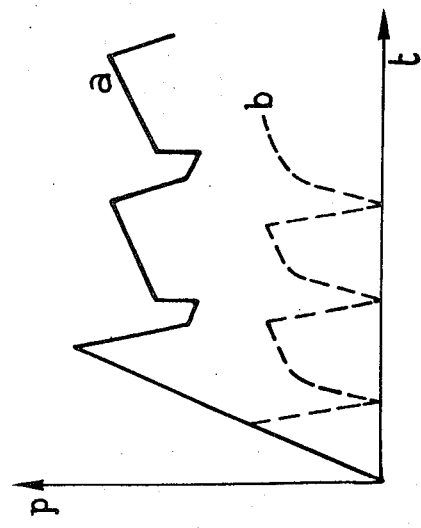
FIG. 2 illustrates graphically the variation of the pressure supplied to the brakes plotted against time for the two modes of operation of the system of FIG. 1.

In the example described, referring to the operation of the anti-skid braking system described in the said Patent Application No. 70339 – A/71, which deals in detail with the anti-skid braking control system 24, 28, 40, it can be seen that the time-variation of the pressure applied to the rear brake cylinders 36 is as shown in FIG. 2. In FIG. 2 the brake pressure variation with time is plotted for the two modes of operation of the system: (a) braking on a dry rod surface and (b) braking on a slippery road surface with intervention of the anti-skid braking control system.

There has been described a preferred embodiment of the invention, in which the repeater valve 30 is controlled by a specific type of anti-skid braking control system, this being considered the best method of operating the invention. Included within the scope of the invention, however, is the use of any suitable type of braking system or other anti-skid control device, provided this is installed according to the principle of the invention, that is in the low pressure control pipe (32) of the repeater valve 30, instead of in the pressure pipes which lead to the brake actuating cylinders, 36.

Moreover, although the present specification refers to a pneumatic braking system, the principle of the invention can be applied with equal efficiency to a braking system of the hydraulic type.

We claim:

1. An anti-skid control system for a vehicle having a first and a second group of actuators operatively associated respectively with first and second groups of wheels of the vehicle; a first fluid pressure source; driver operable brake fluid pressure distributing means having an inlet connected to said first pressure source and an outlet; first line means connecting said outlet to said first group of brake actuators; a second fluid pressure source connected to said second group of brake actuators; repeater valve means having inlet and outlet ports connected respectively to said second pressure source and the second group of actuators, a control port and an exhaust port; said repeater valve means including movable valve bodies, spring means biasing one of said valve bodies in opposition to fluid pressure applied through said control port whereby upon increasing said pressure at said control port the valve body moves from a first position in which said outlet and said exhaust ports are in communication to initially close the communication between said outlet and exhaust ports and to increasingly open communication between said inlet and said outlet port and upon decreasing pressure at said control port said valve body returns to said first position; second line means connecting the outlet of the distributing means to said control port; anti-skid pressure modulating devices in said first line means and control devices sensitive to dynamic wheel state operatively connected to said modulating devices; and an anti-skid braking control system located in said second line means and including an automatic metering device having an inlet port connected to the outlet port of the distributing means and an outlet port, said metering device introducing a throttle between the two ports as a result of a reduction of pressure at the outlet port with respect to the inlet pressure at the inlet port; a solenoid valve provided wtih an inlet port connected to the outlet port of the metering device, an outlet port connected to the control port of the repeater valve means and an exhaust port; said solenoid valve having a first position establishing communication between the inlet and outlet ports and a second position establishing communication between the exhaust and outlet ports; a discharge throttle device having an inlet port connected to the exhaust port of the solenoid valve and an exhaust port, said throttle device providing different flow rates between its inlet and exhaust port in accordance with the pressure at its inlet port; and an antiskid control device operatively connected to and controlling said solenoid valve and sensitive to a change in the dynamic condition of at least one of said second group of wheels.

* * * * *